United States Patent
Friedrichs et al.

(10) Patent No.: US 10,209,142 B2
(45) Date of Patent: Feb. 19, 2019

(54) TEMPERATURE CALIBRATOR

(71) Applicant: SIKA Dr. Siebert & Kühn GmbH & Co. KG, Kaufungen (DE)

(72) Inventors: René Friedrichs, Göttingen (DE); Michael Rehm-Gumbel, Niedenstein (DE); Sebastian Siebert, Kassel (DE); Thomas Meth, Kaufungen (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 192 days.

(21) Appl. No.: 15/283,994

(22) Filed: Oct. 3, 2016

(65) Prior Publication Data

US 2017/0097268 A1    Apr. 6, 2017

(30) Foreign Application Priority Data

Oct. 1, 2015 (DE) .................. 10 2015 116 661

(51) Int. Cl.
*G01K 15/00* (2006.01)

(52) U.S. Cl.
CPC ......... *G01K 15/002* (2013.01); *G01K 15/005* (2013.01)

(58) Field of Classification Search
CPC .............................. G01K 19/00; G01K 15/002
See application file for complete search history.

(56) References Cited

U.S. PATENT DOCUMENTS

| | | |
|---|---|---|
| 3,939,687 A | 2/1976 | Waldron |
| 8,016,952 B2 | 9/2011 | Ishida et al. |

FOREIGN PATENT DOCUMENTS

| | | |
|---|---|---|
| DE | 202005006710 U1 | 7/2005 |
| DE | 102010010618 A1 | 8/2011 |
| EP | 2793008 A1 | 10/2014 |
| GB | 2114293 A | 8/1983 |
| JP | S58129335 A | 8/1983 |
| JP | 2005090921 A | 4/2005 |
| WO | WO-2010040360 A1 | 4/2010 |
| WO | 2014115057 A1 | 7/2014 |

OTHER PUBLICATIONS

Lefmann, Kim. Nuclear Magnetic Ordering in Silver. Roskilde: Risø National Laboratory, 1995.*

* cited by examiner

*Primary Examiner* — Clayton E. LaBalle
*Assistant Examiner* — Leon W Rhodes, Jr.
(74) *Attorney, Agent, or Firm* — Dinsmore & Shohl LLP

(57) ABSTRACT

The object of the invention is a temperature calibrator for calibrating temperature sensors, wherein the temperature calibrator comprises
- at least one calibration volume, the temperature of which is to be adjusted and into which the temperature sensors to be calibrated can be inserted,
- at least one temperature control unit, which is in thermal contact with the calibration volume via one or several thermally conductive bodies,
- at least one temperature sensor, which is in thermal contact with said calibration volume,
- and at least one electrical control unit, which is electrically connected with the at least one temperature control unit and the at least one temperature sensor, wherein the temperature calibrator further comprises at least one magnetocaloric material and at least one magnetic field generating device.

9 Claims, 1 Drawing Sheet

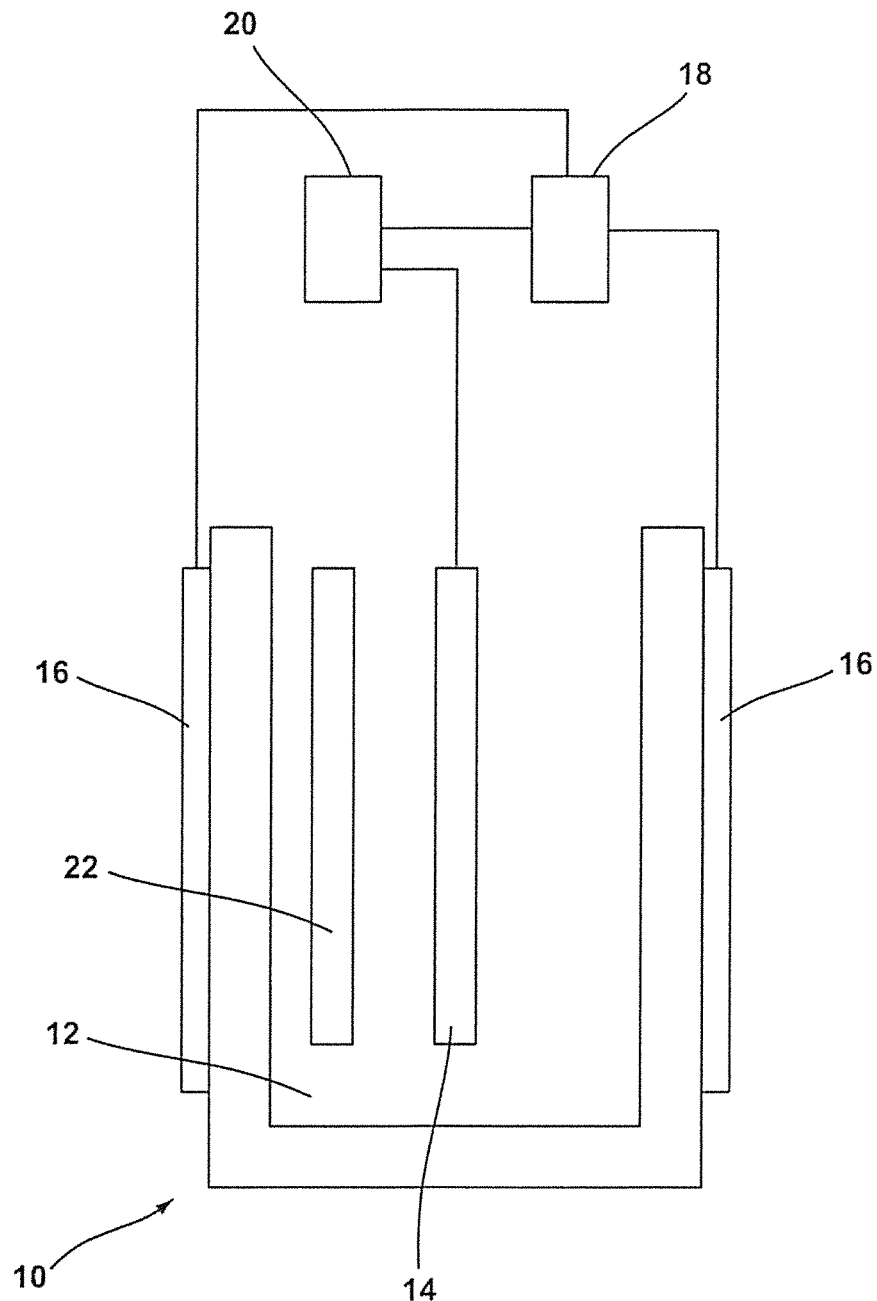

TEMPERATURE CALIBRATOR

CROSS-REFERENCE TO RELATED APPLICATION

This application is the U.S. national phase of international application Ser. No. DE 10 2015 116 661.5, filed Oct. 1, 2015, the contents of which are incorporated herein in their entirety.

FIELD OF THE INVENTION

The invention relates to a temperature calibrator and method for cooling and heating a temperature calibrator.

BACKGROUND OF THE INVENTION

The vast majority of temperature sensors used in industry and research are secondary thermometers. This means that the respective temperature sensors, which contain e.g. thermocouples or temperature-dependent resistances, need to be calibrated at least before their first use and in most cases also repeatedly during their service life. To this end, during the comparison process, the temperature sensors to be calibrated are compared with a standard thermometer in temperature stabilized ovens or baths. Portable devices, which bring a corresponding calibration volume to a specifiable constant nominal temperature, are known from the specification U.S. Pat. No. 3,939,687 A. In order to ensure an optimal thermal coupling of the devices under test with the calibration volume, various inserts, which are adapted to the temperature sensors to be tested or calibrated, can be introduced as solid bodies into the calibration volume of a temperature calibrator. These inserts largely fill up the calibration volume and feature recesses into which the temperature sensors to be calibrated can be inserted. In order to achieve a spatial temperature distribution within the calibration volume that is as constant as possible, the insert, in a dry-block temperature calibrator, respectively the calibration medium, in a temperature calibration bath, should have a thermal conductivity that is as high as possible.

In addition, a cooling and/or deep-freezing apparatus with a temperature sensor for detecting the temperature in one place of or of a component of the cooling and/or deep-freezing apparatus is known from DE 10 2010 010 618 A1. Here, the sensor has a magnetocaloric material or is at least partially comprised of such a material.

As another prior art, DE 11 2006 001 628 T5 describes a ferromagnetic shape-memory alloy, which is able to restore its shape. The shape restoration is accompanied by a magnetic change due to the magnetic-field-induced reconversion to a practical temperature range.

Since the calibration volume must be brought to the nominal temperature prescribed by the user, heat can be removed or added to the calibration volume, in which e.g. an insert with inserted temperature sensors is located, via a thermally conductive body, which surrounds the calibration volume. In portable calibrators, this thermally conductive body is typically implemented as a metal block and is in thermal contact with cooling units, such as e.g. Peltier elements, as described in DE 20 2005 006 710 U1, and heating units, such as e.g. a resistance heater.

BRIEF DESCRIPTION OF THE DRAWINGS

FIG. 1 is a schematic view of an embodiment of a temperature calibrator in accordance with the present invention.

DETAILED DESCRIPTION OF THE INVENTION

In order to set the temperature of the temperature volume 12, the cooling units, e.g. Peltier elements, and the heating units, e.g. a resistance heater, are electrically connected with an electrical control unit 20. This control unit is furthermore electrically connected with at least one temperature sensor 14, which is in thermal contact with the calibration volume 12, and regulates the temperature of the calibration volume 12 by appropriately controlling the power of the temperature control units 18. The response times of this power-controlled temperature regulation are very long both in the heating and cooling modes. In the heating mode the heat must first be generated by the heating units 16, in order to be then transferred via the thermally conductive body, typically formed by the metal block of the temperature calibrator 10, into the calibration volume 12. In this respect, the heat transfer occurs due to a temperature gradient between the heating units and the calibration volume. In the cooling mode, the heat must first be pumped by the cooling units into the surroundings of the temperature calibrator. The subsequent transfer of the heat from the calibration volume via the thermally conductive body, typically formed by the metal block of the temperature calibrator, into the cooling units, again occurs due to the respective temperature gradient between the cooling units and the calibration volume. The problem underlying the invention is thus to replace this slow principle of modifying the temperature of the calibration volume, based either substantially, in the heating mode, or entirely, in the cooling mode, on the transfer of heat, by a faster principle for modifying the temperature of the calibration volume.

To this end, according to the invention, a magnetocaloric material 22 is in thermal contact with the calibration volume and is located inside a magnetic field generated by a magnetic field generating device of the temperature calibrator. It is known that the temperature of the magnetocaloric material changes along with a change in the strength of the magnetic field, to which the material is exposed. An increase of the magnetic field strength leads to an increase of the temperature of the magnetocaloric material. Conversely, a reduction of the magnetic field strength leads to a decrease of the temperature. In both cases, there is no heat transfer and the speed of the process is substantially determined by the speed of change of the magnetic field. By choosing suitable magnetocaloric materials and correspondingly strong magnetic field changes, the installation according to the invention makes it possible to achieve temperature changes in the temperature calibrator of up to 4 Kelvin in less than one second.

Magnetocaloric materials, whose magnetocaloric effect provides a temperature change of more than 1 Kelvin per 1 Tesla of induced magnetic strength, at at least one temperature in the range of −70° C. to +50° C., are particularly suited for the installation according to the invention. In a preferred embodiment of the invention, the magnetocaloric materials used are therefore gadolinium, gadolinium alloys and alloys containing manganese or iron.

The magnetic field generating device of the temperature calibrator according to the invention can consist of a permanent magnet, an electromagnet or a combination of both. In one embodiment, the position or rather the orientation of the permanent or electromagnet relative to the magnetocaloric material can be adjusted, in order to adjust the strength of the magnetic field to which the magnetocaloric material is exposed. To this end, the control unit of the calibrator can for instance be electrically connected with a step motor or linear motor that is mechanically connected with the magnet or magnets. In a preferred embodiment, the temperature of the magnetocaloric material is adjusted roughly but with a strong temperature change by modifying the position or orientation of a strong permanent magnet having magnetic flux densities above one Tesla. Here, a rough adjustment means that, after the rough adjustment, the temperature of the calibration volume can still deviate from the desired nominal temperature for example by up to 250 millikelvins. In a preferred embodiment, an electromagnet of the magnetic field generating device is electrically connected with the control unit of the calibrator for a fine adjustment of the temperature of the calibration volume to a value that deviates less from the nominal temperature. The control unit can then very quickly and very precisely control the magnetic field and thus the temperature of the magnetocaloric material by adjusting the coil current of the electromagnet. Using a combination of permanent magnets and of electromagnets in the magnetic field generating device of the calibrator thus allows a precise adjustment of the temperature in a wide temperature range without the complex use of superconductive coils, so that the adjustment of the temperature of the calibration volume by adjusting a magnetic field and thus the temperature of the magnetocaloric material, in accordance with the invention, is also possible in portable temperature calibrators.

In a preferred embodiment of the invention, the magnetocaloric material is located in the thermally conductive body of the calibration device. This can be implemented for instance by having at least parts of the metal block forming the thermally conductive body composed of a magnetocaloric metal or a magnetocaloric alloy.

In a particularly preferred embodiment, the magnetocaloric material is in direct contact with the temperature sensors to be calibrated. To this end, the inserts, which are adapted to the various sensor diameters and can be inserted into the metal block, can for instance be composed of a magnetocaloric metal or a magnetocaloric alloy.

Since the magnetocaloric effect of a specific material is at its highest around the Curie temperature of said material (see e.g. "On the Curie temperature dependency of the magnetocaloric effect", J. H. Belo, J. S. Amaral, A. M. Pereira, V. S. Amaral, and J. P. Araujo, Appl. Phys. Lett. 100(24), 242407 (2012)), a calibration device according to the invention uses magnetocaloric materials, whose respective Curie temperatures lie in the range of the nominal temperatures that can be set in the temperature calibrator. In a preferred embodiment of the invention, various inserts are associated with various nominal temperature ranges, the Curie temperature of the magnetocaloric material, from which the insert is at least partially made, lying within the associated nominal temperature range. The mapping indicating which magnetocaloric insert is best suited for a magnetocaloric temperature adjustment to a specified nominal temperature is stored in a non-volatile memory of the temperature calibrator, so that when a nominal temperature is specified, the temperature calibrator can display, on a display device, which insert must be inserted into the temperature calibrator to allow for the most optimal magnetocaloric temperature adjustment. To this end, it can be useful to mark possible inserts e.g. with one or several number or letter sequences. Alternately, the inserts can also be directly marked with their respectively associated temperature ranges.

In order to increase the temperature range that can be achieved by the quick magnetocaloric temperature control according to the invention, the previously described heat-transfer-based temperature control principles known from the prior art, such as e.g. using Peltier elements on the outside surfaces of the metal block, can be combined with the magnetocaloric temperature control. In a preferred embodiment for achieving faster cooling, the temperature of the magnetocaloric material, which is located e.g. in the insert of the metal block calibrator, is first increased by magnetocaloric adjustment by increasing the magnetic field. Thus, the Peltier elements can pump the heat out of the calibration volume, in which the insert, which has been heated up according to the invention, is located, in a much more efficient and quick manner, since, at least at first, the temperature gradient points out of the calibration volume. Thereupon, (e.g. 4 Kelvins) before the calibration volume reaches the nominal temperature, the desired nominal temperature can be adjusted very quickly and more specifically in a very controlled manner, by reducing the strength of the magnetic field to which the magnetocaloric material of the insert is exposed, since the magnetocaloric temperature control changes the temperature of the magnetocaloric insert in the calibration volume immediately and with almost no response time. Thus, the magnetocaloric temperature control according to the invention can complement the heat-transfer-based temperature control principles, which are slow and difficult to adjust due to long response times, more specifically for fine adjustments in the range of about 2 Kelvins around the nominal temperature.

Heat-transfer-based temperature control units known from the prior art often use Peltier elements. The direction of the electric current through the Peltier elements determines whether the temperature control unit is used as a heating unit or as a cooling unit. The disadvantage of a heat-transfer-based cooling of the calibration volume of temperature calibrators by means of Peltier elements is its low efficiency as well as a limited net cooling capacity due to the disproportionately increasing ohmic heat losses relative to the operating current.

In another embodiment of the invention, the already described principle of magnetocaloric cooling is also used in at least one heat transfer based temperature control unit of the temperature calibrator. The use of magnetocaloric materials is particularly advantageous in the cooling unit of the calibration device, since during magnetocaloric cooling, the production of ohmic heat is minimized. The generation of ohmic heat when cooling by supplying Peltier elements with electricity, as known in the prior art, is inherent to the functional principle of this process.

In order to pump heat out of an object to be cooled, e.g. the calibration volume, by means of the magnetocaloric cooling unit of the temperature calibrator, which comprises a magnetocaloric material and a magnetic field generating device, in accordance with the invention, and to transfer it into an object to be heated, e.g. the surrounding air, or into the cooling fins of the temperature calibrator, the cooling unit according to the invention, operating as a periodic cooling machine using the magnetocaloric effect, periodically goes through the following method steps in the following order:

A thermal contact between the object to be heated and the magnetocaloric material is established, wherein the magnetocaloric material is located within a magnetic field H1 having a strong field intensity and has no or only little thermal contact with the object to be cooled.

The thermal contact between the object to be heated and the magnetocaloric material is severed or at least reduced.

The magnetocaloric material is exposed to a magnetic field H0 having a low field intensity, wherein H0 is smaller than H1. Preferably, H0=0 A/m.

A thermal contact between the object to be cooled and the magnetocaloric material is established, wherein the magnetocaloric material is still located within the magnetic field H0 having a low field intensity and has no or only little thermal contact with the object to be heated.

The thermal contact between the object to be cooled and the magnetocaloric material is severed or at least reduced.

The magnetocaloric material is again exposed to the magnetic field H1 having a high field intensity, wherein H1 is greater than H0.

Thus, according to the invention, heat is pumped, or rather transferred from the object to be cooled into the object to be heated, as long as the temperature of the object to be cooled is not reduced by more than Delta_T relative to the object to be heated. Delta_T corresponds to the temperature decrease of the magnetocaloric material caused by the reduction of the magnetic field in step 3.

The magnetocaloric cooling unit of the temperature calibrator according to the invention can also be operated as a heating unit using the magnetocaloric effect, by periodically implementing the above method steps in reverse order.

In a preferred embodiment of the magnetocaloric temperature control unit according to the invention, in order to achieve a total temperature difference of more than −70K relative to the surrounding temperature or relative to the temperature of a volume previously cooled by means of another method, several magnetocaloric cooling units are arranged and operated in series, so that the heat to be removed from the calibration volume is transported successively through said magnetocaloric cooling units. In doing so, each one of said units only needs to maintain a temperature difference of a few Kelvins, in order to achieve a total temperature difference of more than −70K.

Since, as has already been mentioned, the magnetocaloric effect of a specific material is greatest around the Curie temperature of that material, a magnetocaloric cooling unit of the temperature calibration device according to the invention preferably uses a magnetocaloric material, the Curie temperature of which lies around the operating temperature, i.e. which, during operation, lies between the temperature of the warmer side and the temperature of the cooler side of the cooling unit.

When operating several cooling units in series, the operating temperatures of these cooling units lie in a wide temperature range, which ranges from a surrounding temperature of e.g. 20° C. (in the cooling unit that is in thermal contact with the environment) to at least the deepest nominal temperature of e.g. −50° C. of the calibration volume of the calibration device (in the cooling unit that is in thermal contact with the calibration volume). Therefore the magnetocaloric temperature control units of the portable temperature calibrator operated in series use magnetocaloric materials with preferably different Curie temperatures.

In an embodiment of the magnetocaloric cooling unit according to the invention, the thermal contact between an object to be cooled or to be heated and the magnetocaloric material is established by bringing the object and the magnetocaloric material into a releasable material contact by pressing them against each other.

In a preferred embodiment, the thermal contact between the magnetocaloric material and an object is established, respectively increased, by pumping a fluid through the magnetocaloric material, through the object and back through the magnetocaloric material.

In a preferred embodiment of the portable temperature calibrator with several cooling units, the cooling units synchronously go through the mentioned method steps 1 to 6.

The invention claimed is:

1. A temperature calibrator for calibrating temperature sensors, comprising
   at least one calibration volume, the temperature of which is to be adjusted and in which the temperature sensors to be calibrated can be inserted;
   at least one temperature control unit, which is in thermal contact with the calibration volume via one or several thermally conductive bodies;
   at least one temperature sensor, which is in thermal contact with said calibration volume;
   at least one electrical control unit, which is electrically connected with the at least one temperature control unit and the at least one temperature sensor;
   at least one magnetocaloric material; and
   at least one magnetic field generating device,
   wherein the magnetocaloric material has a magnetocaloric effect that is greater than a 1 Kelvin temperature change per 1 Tesla of induced magnetic strength.

2. The temperature calibrator according to claim 1, wherein said magnetic field generating device is electrically connected with said electrical control unit and said magnetic field generating device is configured to adjust the magnetic field, to which said magnetocaloric material is exposed, under the control of the electrical control unit.

3. The temperature calibrator according to claim 2, wherein said magnetic field generating device comprises at least one electromagnet, the coil current of which can be controlled by the electrical control unit.

4. The temperature calibrator according to claim 1, wherein said thermally conductive body or at least one insert insertable into the calibration volume is composed at least partially of a magnetocaloric metal or at least partially of a magnetocaloric alloy.

5. A temperature calibrator for calibrating temperature sensors, comprising:
   at least one calibration volume, the temperature of which is to be adjusted and in which the temperature sensors to be calibrated can be inserted;
   at least one temperature control unit, which is in thermal contact with the calibration volume via one or several thermally conductive bodies;
   at least one temperature sensor, which is in thermal contact with said calibration volume;
   at least one electrical control unit, which is electrically connected with the at least one temperature control unit and the at least one temperature sensor;
   at least one magnetocaloric material; and
   at least one magnetic field generating device,
   wherein the magnetocaloric material contains more than three weight percent of gadolinium, manganese or iron.

6. A temperature calibrator, comprising:
   at least one calibration volume, the temperature of which is to be adjusted and in which the temperature sensors to be calibrated can be inserted;
   at least one temperature control unit, which is in thermal contact with the calibration volume via one or several thermally conductive bodies;
   at least one temperature sensor, which is in thermal contact with said calibration volume;
   at least one electrical control unit, which is electrically connected with the at least one temperature control unit and the at least one temperature sensor;
   at least one magnetocaloric material; and at least one magnetic field generating device, wherein said magnetic field generating device is electrically connected with said electrical control unit and said magnetic field generating device is configured to adjust the magnetic field, to which said magnetocaloric material is exposed, under the control of the electrical control unit, wherein said magnetic field generating device comprises at least one permanent magnet, the position and/or orientation of which can be modified by the electrical control unit by means of an electric motor.

7. A temperature calibrator, comprising:

at least one calibration volume, the temperature of which is to be adjusted and in which the temperature sensors to be calibrated can be inserted;

at least one temperature control unit, which is in thermal contact with the calibration volume via one or several thermally conductive bodies;

at least one temperature sensor, which is in thermal contact with said calibration volume;

at least one electrical control unit, which is electrically connected with the at least one temperature control unit and the at least one temperature sensor;

at least one magnetocaloric material; and at least one magnetic field generating device, wherein said thermally conductive body or at least one insert insertable into the calibration volume is composed at least partially of a magnetocaloric metal or at least partially of a magnetocaloric alloy, wherein the temperature calibrator comprises a non-volatile memory, in which a mapping is stored, indicating which magnetocaloric insert is best suited for a magnetocaloric temperature adjustment to a specified nominal temperature of the calibration volume.

8. A method for controlling the temperature of the calibration volume of a temperature calibrator having:

at least one calibration volume, the temperature of which is to be adjusted and in which the temperature sensors to be calibrated can be inserted;

at least one temperature control unit, which is in thermal contact with the calibration volume via one or several thermally conductive bodies;

at least one temperature sensor, which is in thermal contact with said calibration volume;

at least one electrical control unit, which is electrically connected with the at least one temperature control unit and the at least one temperature sensor;

at least one magnetocaloric material; and at least one magnetic field generating device, wherein said magnetic field generating device is electrically connected with said electrical control unit and said magnetic field generating device is configured to adjust the magnetic field, to which said magnetocaloric material is exposed, under the control of the electrical control unit, wherein the magnetic field generating device comprises at least one permanent magnet and at least one electromagnet, the position and/or orientation of the permanent magnet modifiable by the electrical control unit, the coil current of the electromagnet controllable by the electrical control unit, the method comprising in a first method step, the temperature of the calibration volume is roughly adjusted by modifying the position and/or orientation of a permanent magnet, and in a second method step, the temperature of the calibration volume is finely adjusted by modifying the coil current of an electromagnet.

9. A method for operating a magnetocaloric temperature control unit of a temperature calibrator, wherein the magnetocaloric temperature control unit comprises at least one magnetocaloric material and at least one magnetic field generating device and the temperature calibrator comprises at least one object to be cooled and at least one object to be heated, the method comprising the following method steps periodically executed in the given order:

a) A thermal contact between the object to be heated and the magnetocaloric material of the temperature control unit is established, wherein the magnetocaloric material of the temperature control unit is located within a magnetic field H1 having a strong field intensity and has no or only little contact with the object to be cooled;

b) The thermal contact between the object to be heated and the magnetocaloric material of the temperature control unit is severed or at least reduced;

c) The magnetocaloric material of the temperature control unit is exposed to a magnetic field H0 having a low field intensity, wherein H0 is smaller than H1;

d) A thermal contact between the object to be cooled and the magnetocaloric material of the temperature control unit is established, wherein the magnetocaloric material of the temperature control unit is still located within the magnetic field H0 having a low field intensity and has no or only little thermal contact with the object to be heated;

e) The thermal contact between the object to be cooled and the magnetocaloric material of the temperature control unit is severed or at least reduced;

f) The magnetocaloric material of the temperature control unit is again exposed to the magnetic field H1 having a high field intensity, wherein H1 is greater than H0; and g) magnetic field H1 having a high field intensity, wherein H1 is greater than H0.

* * * * *